United States Patent [19]

Miyadai et al.

[11] Patent Number: 5,678,302
[45] Date of Patent: Oct. 21, 1997

[54] APPARATUS FOR WINDING A HEATING WIRE

[75] Inventors: Yasushi Miyadai; Mitsuru Ono, both of Hiratsuka, Japan

[73] Assignee: Mitsubishi Plastics, Inc., Tokyo, Japan

[21] Appl. No.: 696,229

[22] Filed: Aug. 13, 1996

Related U.S. Application Data

[62] Division of Ser. No. 333,298, Nov. 1, 1994, Pat. No. 5,581,872.

[30] Foreign Application Priority Data

Nov. 9, 1993 [JP] Japan .................. 5-279890

[51] Int. Cl.$^6$ .................. B23P 19/00; H01R 43/04
[52] U.S. Cl. .................. 29/742; 29/753; 29/760; 29/761; 29/621; 29/863; 29/867; 29/564.6; 140/92.2; 242/445.1; 242/447.3
[58] Field of Search .................. 29/729, 732, 742, 29/748, 753, 760, 761, 564.4, 564.6, 618, 619, 621, 863, 867; 242/445.1, 447.3; 140/92.1, 92.2

[56] References Cited

U.S. PATENT DOCUMENTS

| | | | |
|---|---|---|---|
| 3,707,756 | 1/1973 | Wolyn | 29/748 |
| 3,940,228 | 2/1976 | Griffin | 140/92.1 |
| 5,214,838 | 6/1993 | Beakes et al. | 29/863 |
| 5,240,044 | 8/1993 | Arnold | 140/92.1 |

*Primary Examiner*—P. W. Echols
*Attorney, Agent, or Firm*—Oblon, Spivak, McClelland, Maier & Neustadt, P.C.

[57] ABSTRACT

An apparatus for winding a heating wire on a core for forming the inner periphery of an electric melt-bonding joint which comprises a core in a generally cylindrical shape which is capable of rotating around its axial center, the core being relatively moved in the axial direction with respect to a heating wire, an engaging piece mounted on the core, which has a holding portion for holding a heating wire, and a fixing means to fix a terminal pin to the leading end of the heating wire. The engaging piece has a holding portion for holding the terminal pin, whereby the heating wire is wound on an outer peripheral portion of the core by rotating the core.

3 Claims, 4 Drawing Sheets

FIGURE 6(a)
FIGURE 6(b)
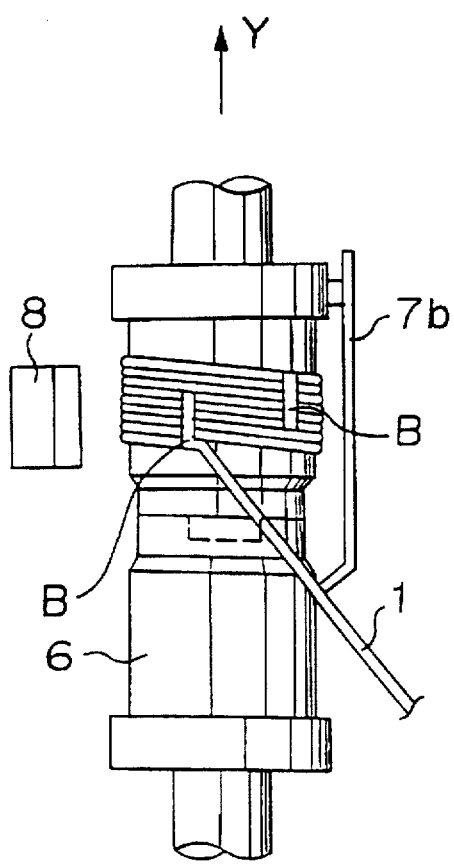
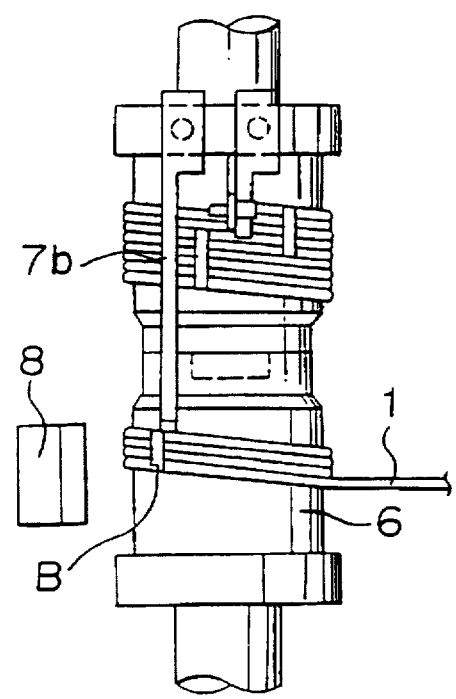

APPARATUS FOR WINDING A HEATING WIRE

This is a Division of application Ser. No. 08/333,298 filed on Nov. 01, 1994 now U.S. Pat. No. 5,581,872.

BACKGROUND OF THE INVENTION

1. Field of the Invention

The present invention relates to a method of and an apparatus for winding a heating wire on an outer peripheral portion of a core for forming by injection molding an electrically melt-bonding joint in which the heating wire is embedded in the joint.

2. Discussion of the Background

In recent years, when synthetic resin pipes such as gas pipes, water pipes or the like are connected to each other, an electrically melt-bonding joint A in which a heating wire 1 is embedded in the inner peripheral surface of its socket portions as shown in FIG. 8 have been used. When the pipes are connected with the electrically melt-bonding joint A, the synthetic resin pipes are inserted to the socket portions at both ends and a power source is connected to terminal pins 1a attached to the heating wire 1 to heat the wire whereby the synthetic pipe is melt-bonded to the joint.

A method of making the electrically melt-bonding joint, which has been widely used, comprises a winding step wherein the heating wire is wound in a coil form by a predetermined number of turns on an outer peripheral portion of a core for forming the inner periphery of the joint, a terminal processing step wherein the heating wire is cut to have a predetermined length, and each end portion of the heating wire is inserted into each terminal pin to thereby electrically connect the terminal pins to the heating wire, and a shaping step wherein the core on which the heating wire is wound in a coil form is set in a metal mold, and molten resin is injected into the metal mold.

However, the conventional method had problems in the winding step and the terminal processing step in the manufacture of the electrically melt-bonding joint. Namely, when the terminal pins are electrically connected to both ends of the heating wire after the heating wire has been wound on an outer peripheral portion of the core, it was necessary to conduct operations for connecting the terminal pins to the heating wire in a limited narrow space near the core. Accordingly, it was difficult to employ automation or a linear arrangement for the winding step and the terminal processing step, and these steps were obliged to rely on manual labor. Further, in a case that after the heating wire has been wound on an outer peripheral portion at an end of the core, the wire has to be wound on an outer peripheral portion at the other side. In this case, the distance of wound portions is spaced as indicated by broken lines in FIG. 8. Thus, when the spacing operation and the winding operation for the heating wire are conducted manually, deflection of the position is apt to occur, and a correcting operation by manual labor is needed after the winding operation.

Accordingly, in the conventional method, there was scattering in the quality of products and reduction in yield or production cycle, whereby it was difficult to supply the products at a lower price.

SUMMARY OF THE INVENTION

It is an object of the present invention to provide a method of and an apparatus for winding a heating wire capable of easily and certainly winding a heating wire on an outer peripheral portion of a core without causing scattering in quality by employing automation and energy saving for a winding step and a terminal processing step.

In accordance with the present invention, there is provided a method of winding a heating wire coated with an insulation resin on an outer peripheral portion of a core for forming the inner periphery of an electrically melt-bonding joint, the method being characterized by comprising the following steps (1) through (4):

(1) drawing out the leading end of a heating wire wound on a rewinding roller; peeling off an insulation resin at the leading end portion of the heating wire and connecting to a leading end portion a terminal pin; and engaging the terminal pin with an engaging piece which is rotatable along with a core, and rotating the core so that the heating wire is wound on an outer peripheral portion of the core, (2) continuing to rotate the core to wind the heating wire on the outer peripheral portion of the core by a predetermined number of turns; stopping the rotation of the core, and applying an electric heating iron onto a wound portion of the heating wire to melt the insulation resin on the heating wire and at the same time, melt-bonding adjacent portions of the wound heating wire with the molten insulation resin, (3) starting to rotate the core to wind the heating wire on an outer peripheral portion by a predetermined number of turns; stopping the rotation of the core; cutting an unwound portion of the heating wire; peeling off the insulation resin covering the heating wire near the cut portion, and fixing a terminal pin to the rear end near the cut portion of the heating wire, and (4) engaging the terminal pin fixed to the rear end of the heating wire with a pulling device; rotating the core while applying a tension to the heating wire so that the rear end portion of the heating wire is wound on an outer peripheral portion of the core, and applying the electric heating iron onto the heating wire near the terminal pin to melt the insulation resin covering the heating wire and at the same time, to melt-bond the rear end portion to the adjacent portion of the heating wire with the molten insulation resin.

Further, in accordance with the present invention, there is provided an apparatus for winding a heating wire on a core for forming the inner periphery of an electric melt-bonding joint which comprises a core in a generally cylindrical shape which is capable of rotating around its axial center, the core being relatively moved in the axial direction with respect to a heating wire, an engaging piece mounted on the core, which has a holding portion for holding a heating wire, and a fixing means to fix a terminal pin to the leading end of the heating wire, wherein the engaging piece has a holding portion for holding the terminal pin, whereby the heating wire is wound on an outer peripheral portion of the core by rotating the core.

Further, in accordance with the present invention, there is provided an apparatus for winding a heating wire on a core for forming the inner periphery of an electrically melt-bonding joint which comprises a core in a generally cylindrical shape, an engaging piece mounted on the core, which has a holding portion for holding a heating wire, a spacing means for spacing the distance of the heating wire to be wound on the core, a fixing means for fixing a terminal pin to the leading end of the heating wire, means for engaging the heating wire with the spacing means, and means for rotating the core around its center axis and causing relative movement of the same in its axial direction with respect to the heating wire, whereby the heating wire is wound continuously at both sides of the outer periphery of the core.

BRIEF DESCRIPTION OF THE DRAWINGS

In the drawings:

FIGS. 6(a) and 6(b) are schematic views showing a state that the heating wire is spaced;

DESCRIPTION OF THE PREFERRED EMBODIMENTS

Preferred embodiments of the method and the apparatus according to the present invention will be described in detail with reference to the drawings.

Figure 1:
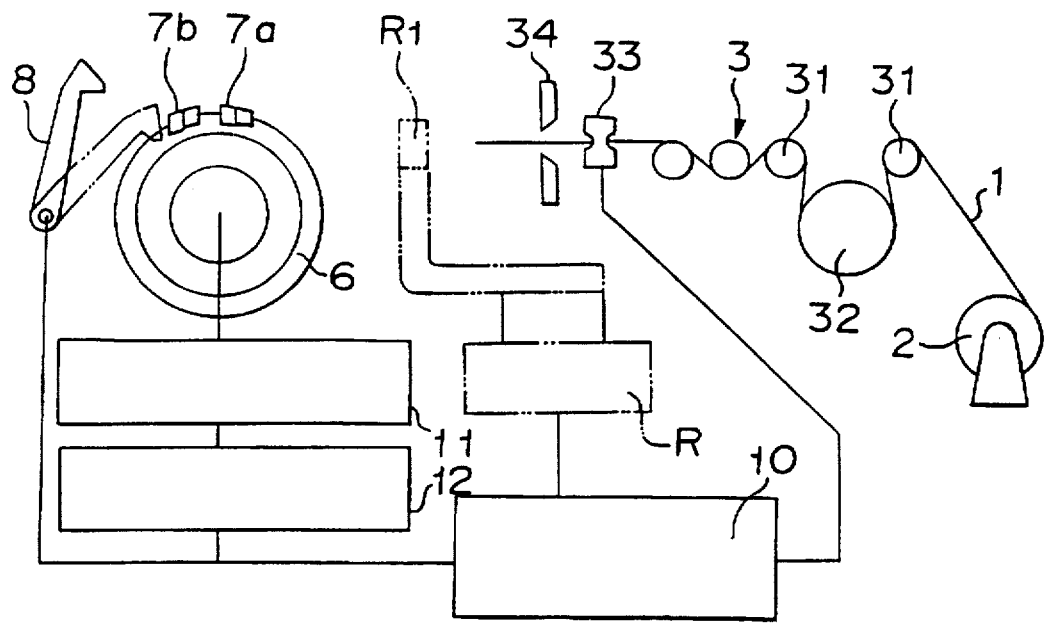
FIG. 1 is a front view for schematically showing an embodiment of an apparatus used for the method of the present invention.
Figure 2:
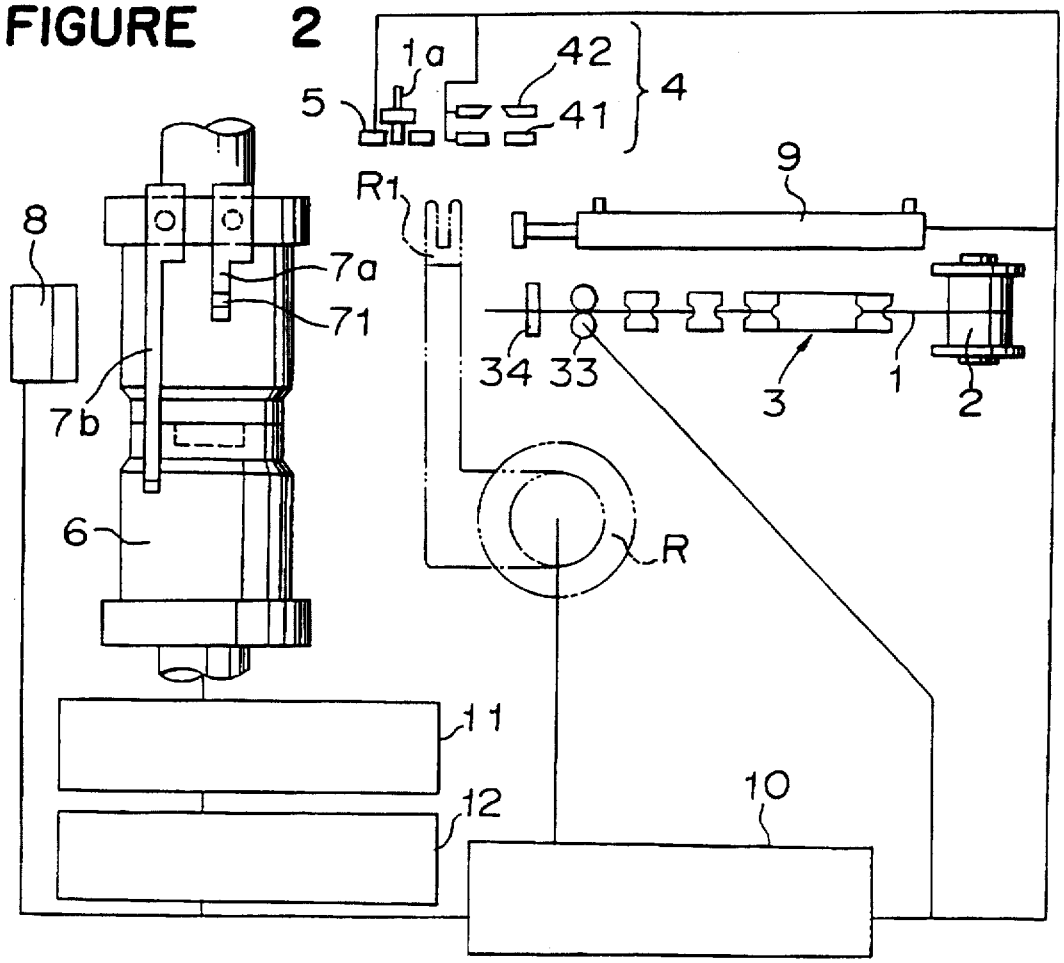
FIG. 2 is a plane view for schematically showing the apparatus shown in FIG. 1.

In FIGS. 1 and 2, reference numeral 1 designates a heating wire such as a nichrome wire, the outer surface of which is coated with an insulation resin such as polyethylene, polybutene or the like. The heating wire 1 is wound on a rewinding roller 2 and it is drawn through a transferring device 3. Numeral 6 designates a core on which the heating wire 1 is to be wound. The core 6 is rotated around its axial center and moved in its axial direction by means of a rotating and driving device 11 and in association with an automatic feeding device 12 for feeding the heating wire from the rewinding roller 2, the rotating and driving device and the automatic feeding device being driven by signals from a controller 10.

An engaging piece 7a and a wire spacing tool 7b are respectively detachably mounted on an end portion of the core 6. Numeral 8 designates an electric heating iron, numeral 9 designate a pulling device and a symbol R designates a robot, these elements being driven according to signals from the controller 10.

The heating wire 1 wound on the rewinding roller 2 is drawn through the transferring device 3 comprising guide rollers 31, a tension roller 32, a nip roller 33 and so on. A cutter 34 is disposed at the feeding side of the nip roller 33 so as to cut the heating wire 1 by the aid of a hydraulic device (not shown) or the like.

The leading end of the heating wire 1 fed through the nip roller 33 is gripped by an arm R1 of the robot R operated in association with the rotating and driving device (not shown), and the heating wire 1 is successively transferred to operational positions for a peeling-off step, a caulking step, a winding step and so on. A stripper 4 and a caulking device 5 are disposed near the arm R1 of the robot R.

Figure 3:
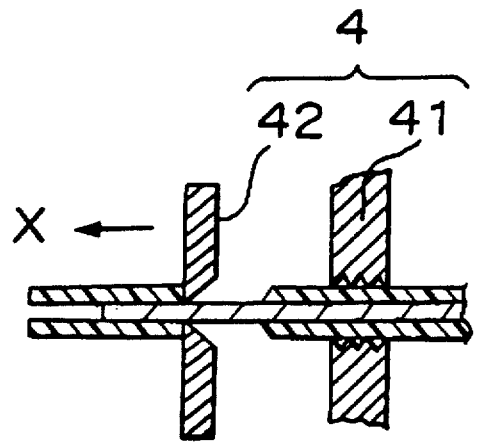
FIG. 3 is a schematic view in cross-section showing a step of peeling-off a heating wire.

In the peeling-off step, the insulation resin covering the leading end portion of the heating wire 1 is peeled off with the stripper 4. As shown in FIG. 3, the stripper 4 comprises each pair of grippers 41 and cutting blades 42. The leading end portion of the heating wire 1 is gripped by the pair of grippers 41 and the free end side of the heating wire is clamped by the cutting blades 42. Then, the cutting blades 42 are moved in the direction of X in FIG. 3 so that the insulation resin covering the leading end portion of the heating wire 1 is peeled off.

Figure 4:
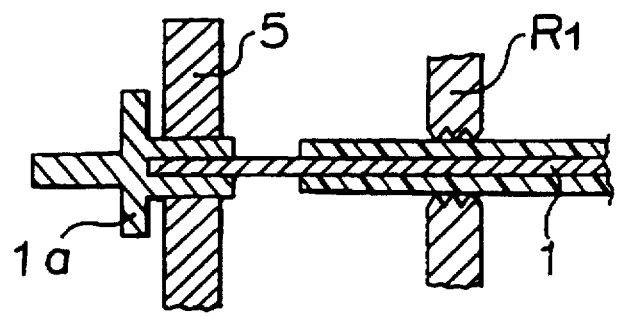
FIG. 4 is a schematic view in cross-section showing a step of caulking a terminal pin.

In the caulking step, a terminal pin 1a is connected to the leading end portion of the heating wire 1 which has been subjected to the peeling-off operation of the insulation resin. The terminal pin 1a is successively supplied by means of an aligning device such as a parts feeder or the like (not shown). Into a connecting hole formed in the terminal pin 1a transferred through an automated system, the leading end portion of the heating wire 1 is inserted, and then, the terminal pin 1a is pressed by the caulking device 5 as shown in FIG. 4.

In the winding, the terminal pin 1a connected to the leading end portion of the heating wire 1 is fitted to the engaging piece 7a which is mounted on an end of the core 6.

Figure 5:
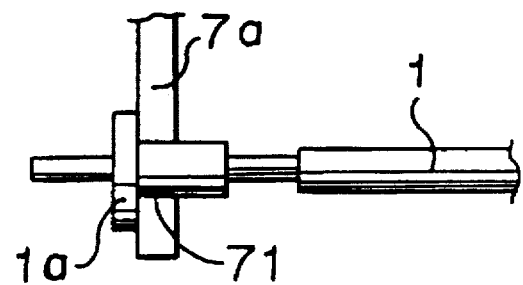
FIG. 5 is a plane view showing a state that the terminal pin is engaged with an engaging piece.

As shown in FIG. 5, a notch portion or a recess 71 is formed in an upper surface of the free end of the engaging piece 7a so as to receive the terminal pin 1a. The terminal pin 1a is engaged with the notch portion 71. In this case, the spacing tool 7b is previously disengaged from the one end portion of the core 6. The core 6 is rotated around its axial center and at the same time, moved in the axial direction whereby the heating wire 1 is wound on an outer peripheral portion of the core.

In the winding step, it is important to wind the heating wire 1 in a state that the heating wire 1 intersects substantially in perpendicular to the axial center of the core 6. Thus, the heating wire 1 can be wound in a coil form in contact with the outer peripheral portion of the core 6. In this case, it is desirable to control a pulling force to the heating wire 1 wound on the core 6 to be constant by means of the tension roller 32 or the like in the transferring device 3.

When the heating wire 1 has been wound by a predetermined number of turns on the outer peripheral portion of the core, the rotation of the core 6 is stopped. Then, the electric heating iron 8 is applied to the wound portion of the heating wire 1 to melt the insulation resin covering the outer periphery of the heating wire 1, whereby adjacent portions of the wound heating wire are melt-bonded with molten resin as indicated by a symbol B in FIG. 6(a). Thereafter, the winding operation to the heating wire 1 is started to an outer peripheral portion at the other end side of the core 6.

Before starting the winding of the heating wire 1 on 10 the outer peripheral portion of the other end side of the core 6, which has stopped rotating, the spacing tool 7b is fitted to an end of the core, as shown in FIG. 6(a), and then, the core 6 is moved to a certain extent in the direction of Y in FIG. 6(a) so that the heating wire 1 is engaged with the free end portion of the spacing tool 7b. Then, the position of starting the winding of the heating wire 1 is determined, and then, the core is rotated, whereby the heating wire 1 is wound by a predetermined number of turns on the outer peripheral portion of the other end side of the core 6. Then, the rotation of the core 6 is stopped. Thereafter, the electric heating iron 8 is applied to several portions of the heating wire 1 wound in a coil form, whereby adjacent portions of the heating wire are joined with molten resin as shown in FIG. 6(b).

Figure 7A:
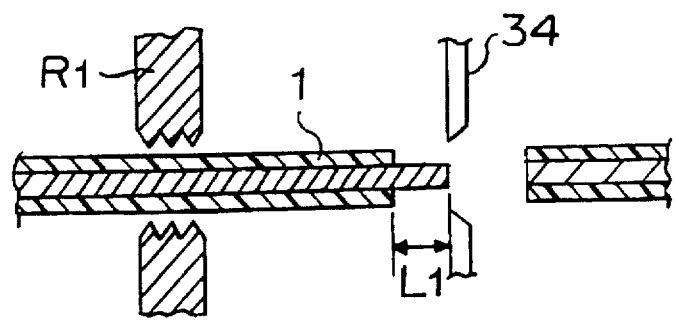
FIGS. 7(a), 7(b) and 7(c) are schematic views showing steps that a tensile force acting on the heating wire is released, and then, the terminal pin is connected to the rear end portion of the heating wire.
Figure 7B:
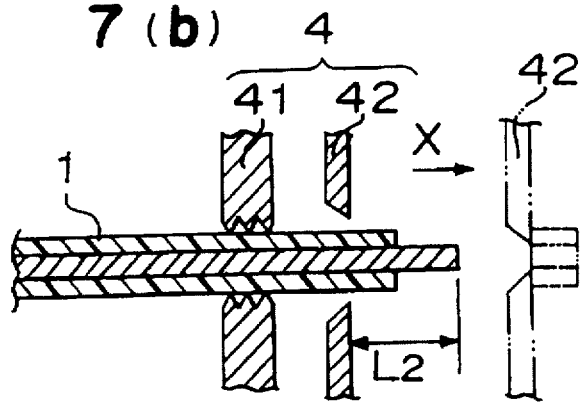
Figure 7C:
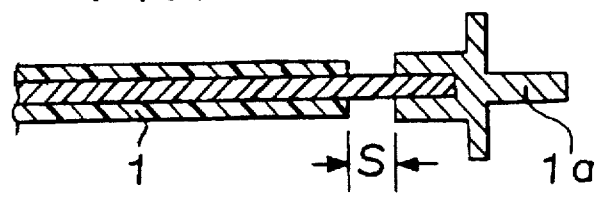

Thus, the heating wire is wound by a predetermined number of turns on the outer peripheral portion of the other end side of the core 6 by repeating the winding operations and the melt-bonding operations of the heating wire, and then, the rotation of the core 6 is stopped and an unwound portion of the heating wire 1 is cut with a cutter 34. The cut portion, i.e. the rear end portion of the heating wire 1 is treated to peel off the insulation resin covering the rear end portion, and a terminal pin 1a is connected to the rear end portion in the same manner as the before-mentioned operations. In this case, as shown in FIGS. 7(a)–(c), the length S of the portion of the heating wire 1 where the insulation resin is peeled off can be constant by releasing a pulling force acting on the heating wire 1 and connecting the terminal pin 1a to the rear end portion of the heating wire 1. Namely, in the caulking step for the terminal pin, the heating wire 1 gripped by the arm R1 of the robot R is cut with the cutter 34, and then, the gripping force of the arm R1 is released as shown in FIG. 7(a). Then, a tensile force acting on the heating wire 1 in the winding step is released, and at the same time, the insulation resin covering the outer periphery of the heating wire 1 is shrunk by a length L1 from the cut end portion. Then, a rear end portion of the heating wire 1 is gripped by the grippers 41 of the stripper 4 and cutting blades 42 are moved in the direction of X to peel off the insulation resin at the rear end portion of the heating wire 1 by a length L2. Thereafter, the terminal pin 1a is caulked and fixed to the rear end portion. Thus, by connecting the terminal pin 1a after the tensile force acting on the heating wire 1 has been released, the length S of the peeled-off portion of the insulation resin can be made constant without causing the shrinkage of the insulation resin after the connection of the terminal pin 1a.

Then, the terminal pin 1a connected to the rear end portion of the heating wire 1 is engaged with a pulling device 9. The core 6 is rotated while a predetermined tensile force is applied to the rear end side of the heating wire 1 whereby the rear end portion of the heating wire 1 is wound on the outer peripheral portion of the core 6.

Finally, the electric heating iron 8 is applied to the heating wire 1 at a portion near the terminal pin 1a to thereby melt the insulation resin and join the rear end portion of the heating wire 1 to the adjoining portion of the wire.

Figure 8:
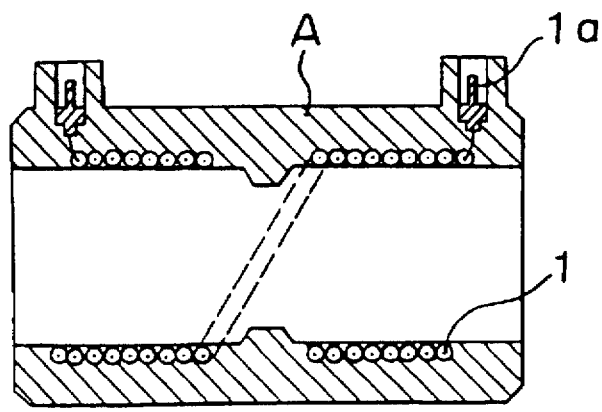
FIG. 8 is a longitudinal cross-sectional view of an electrically melt-bonding joint obtained by the method and the apparatus of the present invention.

After the heating wire has been wound on the outer peripheral portions of the core 6, the engaging piece 7a and the spacing tool 7b are removed, and the core 6 is put in a metal mold. Then, molten resin such as polyethylene, polybutene or the like is injected into a cavity formed between the core 6 and the metal mold whereby the electrically melt-bonding joint A as shown in FIG. 8 can be obtained.

In the above-mentioned embodiment, the heating wire 1 is wound on an outer peripheral portion of an end side of the core 6; the spacing tool 7b is used to space the heating wire on the core 6, and then, the heating wire 1 is wound on an outer peripheral portion of the other end side of the core 6. However, when the heating wire is wound continuously without any space on an outer peripheral portion of the core 6, the spacing operation for the heating wire 1 is unnecessary.

Further, in the embodiment, the core is moved in the axial direction while the heating wire is wound on an outer peripheral portion of the core. However, the same effect can be obtained by winding the heating wire 1 while the heating wire 1 is moved in the axial direction of the core 6. Further, the engaging piece 7a and the spacing tool 7b may be mounted on the rotating and driving device if the device is disposed at an end side of the core 6 on which the heating wire 1 is wound.

In accordance with a method of and an apparatus for winding a heating wire according to the present invention, the employment of an automation system and energy saving in the winding step and the terminal processing step are possible, and the heating wire can be wound easily and certainly on an outer peripheral portion of a core.

Further, there is no danger of causing a shift or looseness of the heating wire wound on the core. Accordingly, when an electrically melt-bonding joint is manufactured by injecting molding, a failure of melt-bonding due to a short circuit of the electric wire does not occur, and a product free from scattering in quality can be manufactured.

In the present invention, an electric heating iron is applied to a wound portion of the heating wire to melt insulation resin to thereby melt bond adjacent portions of the heating wire. Accordingly, there is no shift of position of the heating wire.

Further, the heating wire can be tightly wound on the core by engaging a terminal pin fixed to an end portion of the heating wire to apply a tensile force to the heating wire.

Further, after the winding of the heating wire on an outer peripheral portion of an end of the core, the rotation of the core is stopped; the heating wire is engaged with a spacing tool, and the core is started to rotate. Accordingly, the heating wire is wound on an outer peripheral portion of the other end side of the core without causing a shift of position of the heating wire.

We claim:

1. An apparatus for winding a heating wire on a core for forming an inner periphery of an electric melt-bonding joint, the apparatus comprising:

a core in a generally cylindrical shape which is capable of rotating around its axial center, the core being relatively moved in an axial direction with respect to a heating wire;

a fixing means for fixing a terminal pin to a leading end portion of a heating wire; and an engaging piece mounted on the core, which has a holding portion for holding the terminal pin fixed on the heating wire;

wherein the core is rotated when the engaging piece holds the terminal pin to permit the heating wire to be wound on an outer peripheral portion of the core.

2. An apparatus for winding a heating wire on a core for forming an inner periphery of an electrically melt-bonding joint, the apparatus comprising:

a core in a generally cylindrical shape;

a fixing means for fixing a terminal pin to a leading end portion of a heating wire;

an engaging piece mounted on the core, which has a holding portion for holding the terminal pin fixed on the heating wire;

a spacing means for spacing a distance of the heating wire to be wound on the core;

means for engaging the heating wire with the spacing means; and means for selectively rotating and stopping the rotation of the core around its center axis, and causing relative movement of the core in its axial direction with respect to the heating wire, to permit the heating wire to be first continuously wound on a first side of an outer periphery of the core and to thereafter be continuously wound on a second side of the outer periphery of the core.

3. An apparatus for winding a heating wire on a core for forming an inner periphery of an electrically melt-bonding joint, the apparatus comprising:

a generally cylindrical shaped core;

holding means on said core for holding a terminal pin attached to a leading end portion of a heating wire so as to permit the heating wire to be continuously wound on a first side of the core;

spacing means for spacing a distance of the heating wire to be wound on the core;

means for engaging the heating wire with the spacing means so as to permit the heating wire to be continuously wound on a second side of the core; and means for starting a rotation of said core when said holding means holds the terminal pin to continuously wind the heating wire on the first side of the core, stopping a rotation of said core so as to axially move the core, and restarting a rotation of said core after the core is axially moved and when said heating wire is engaged with said spacing means to continuously wind the heating wire around the second side of said core.

* * * * *